June 22, 1937.  P. B. STREANDER  2,084,659
TREATMENT OF SEWAGE, INDUSTRIAL WASTE, AND THE LIKE
Filed April 12, 1935  4 Sheets-Sheet 1
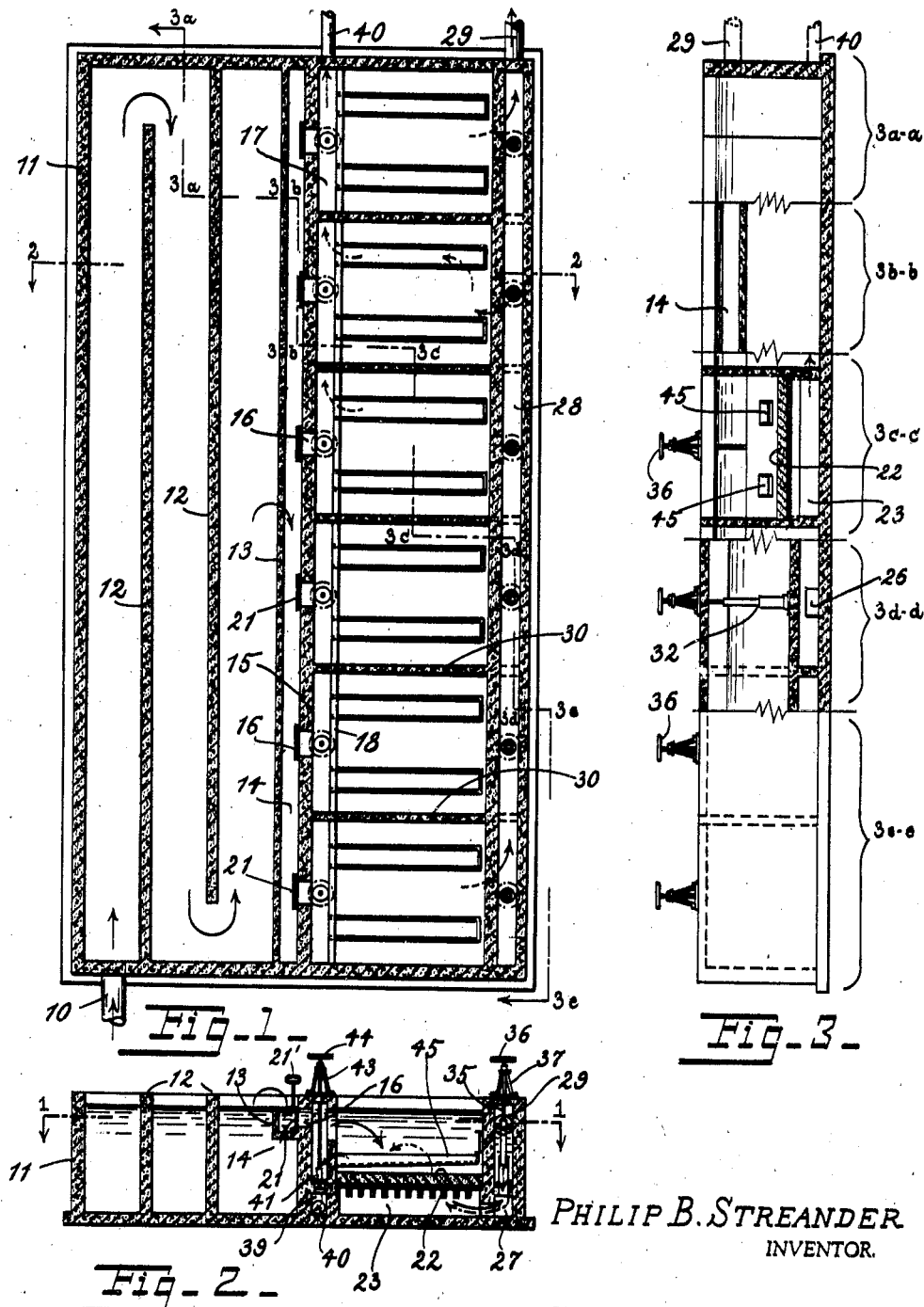
Philip B. Streander
INVENTOR.
BY
his ATTORNEY.

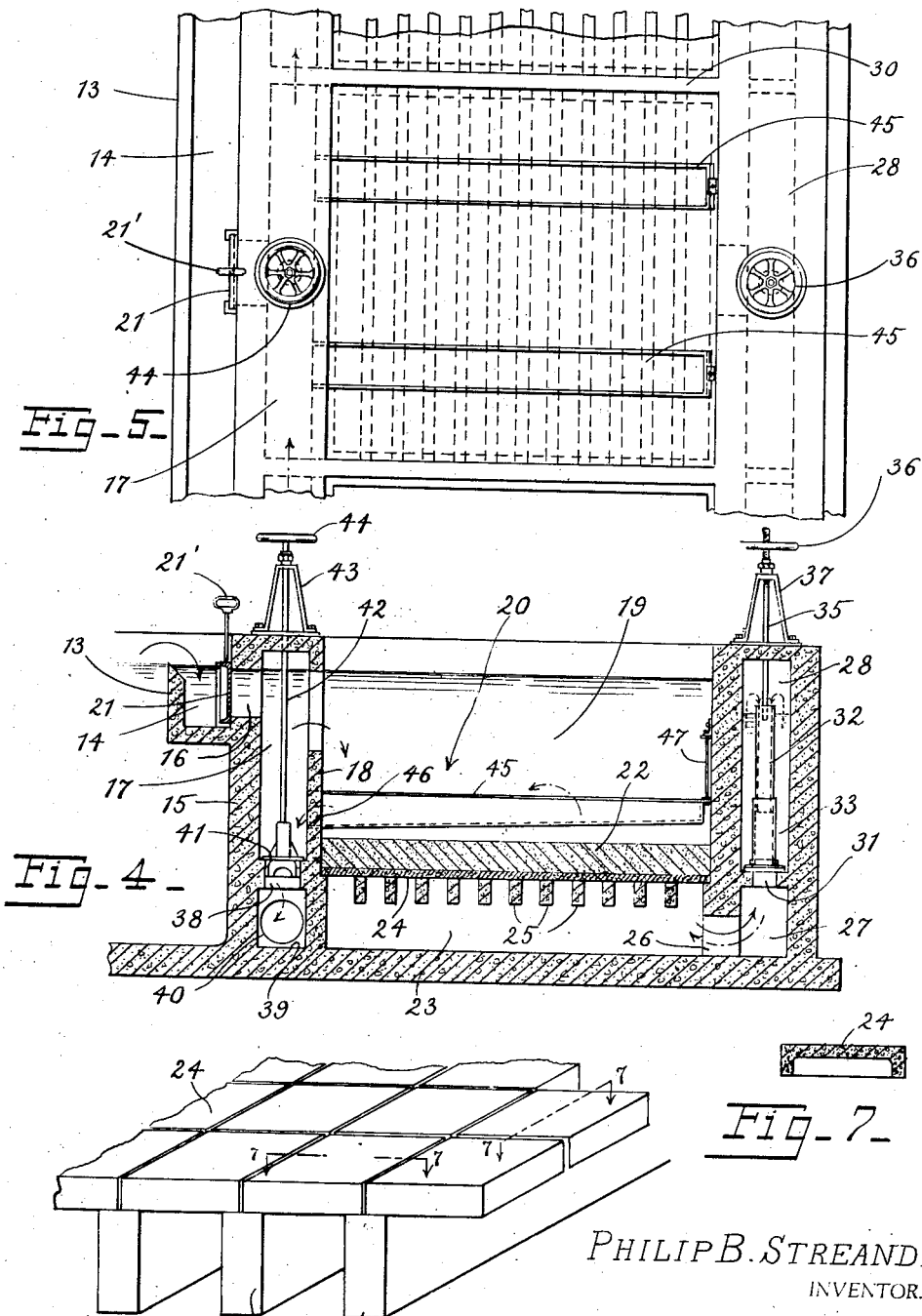

PHILIP B. STREANDER
INVENTOR.

BY Louis L. Ansart his ATTORNEY.

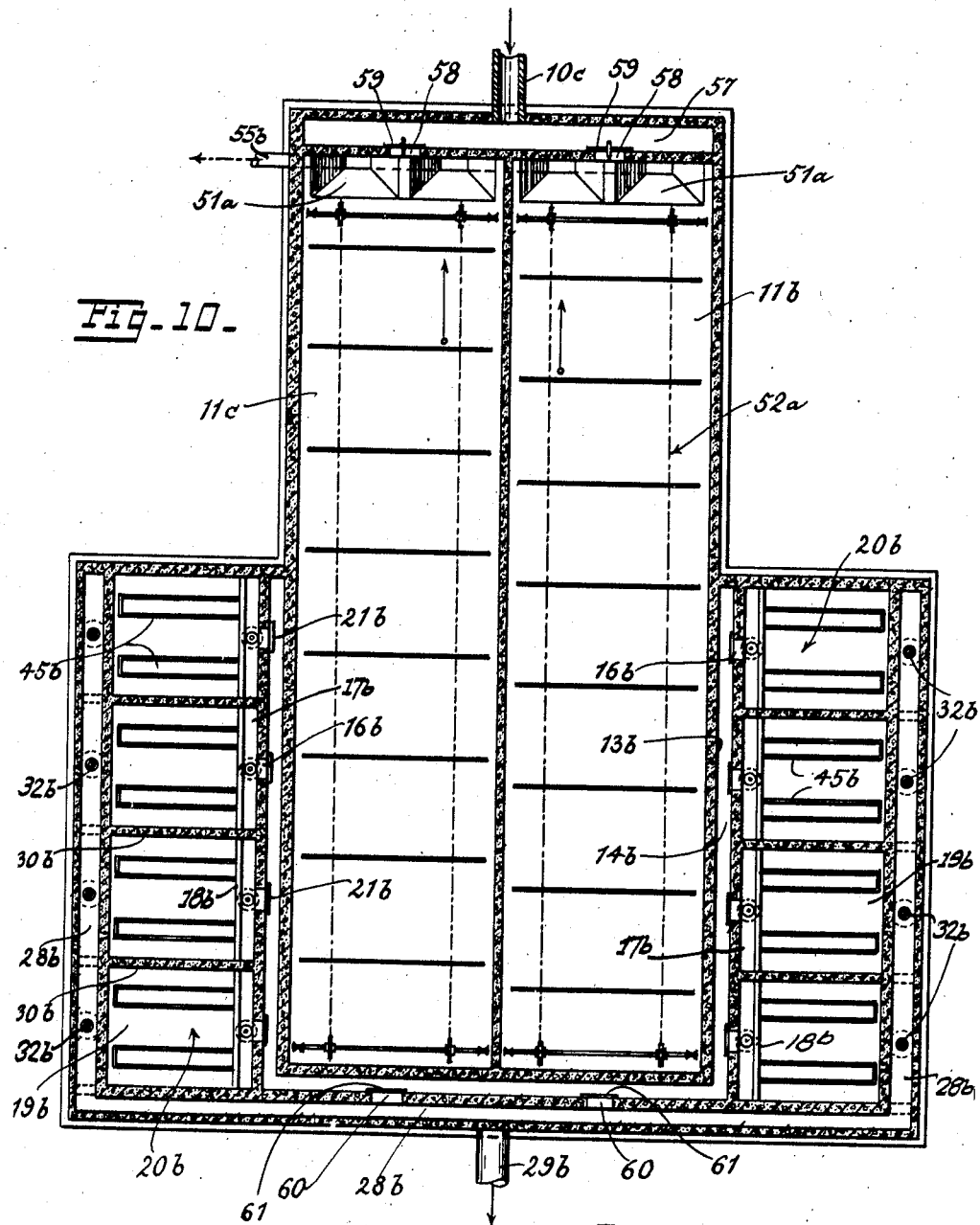

Patented June 22, 1937

2,084,659

UNITED STATES PATENT OFFICE 2,084,659

TREATMENT OF SEWAGE, INDUSTRIAL WASTE, AND THE LIKE

Philip B. Streander, Scarsdale, N. Y., assignor, by mesne assignments, to Underpinning & Foundation Company, Inc., New York, N. Y., a corporation of New York Application April 12, 1935, Serial No. 16,066

8 Claims. (Cl. 210—5)

This invention relates to the treatment of sewage and the like and more particularly to methods of and apparatus for sewage treatment involving the preliminary removal of suspended solids, as by settling, and subsequent filtration.

Important objects of the invention relate to the provision of novel and advantageous methods and means for sewage treatment of the general character specified. An important feature relates to the provision, in association with a settling tank or basin, of a filter receiving the supernatant liquid substantially directly from the settling tank. Another feature relates to the provision, in connection with a settling tank and a filter receiving liquid therefrom, of advantageous means for cleaning the filter. A further feature relates to novel and advantageous means for cleaning a filter by means of back wash or reverse flow.

In carrying out the invention in a preferred manner, the supernatant liquid overflows from the settling tank into a channel or launder from which it flows through openings, controlled by gates or other suitable means, into a relatively deep channel provided at its bottom with one or more outlets discharging into a waste water conduit. Such outlets are normally closed and the supernatant liquid passes over a low wall into a filter channel preferably divided into filter sections, each comprising a section or compartment divided by a filter bed into an upper compartment and a lower filtered effluent compartment. Due to the hydrostatic head of the liquid in the filter channel, the liquid is forced through the filter bed or beds and upwardly from said lower compartments or chambers into an effluent channel provided with an outlet somewhat below the normal level in the filter channel, provision being made of adjustable means whereby the liquid can not ordinarily flow back to the filter but can be permitted to do so when the liquid in the filter channel is drawn down to a lower level. The filter bed may be of any suitable material, such as silica sand, crushed coal, quartz, ground glass, etc., supported on porous filter plates.

When the solids retained in a filter bed accumulate to a sufficient extent and there is a predetermined loss of rate of filtration, the supply from the settling tank is shut off from a filter section and the connections with the waste water conduit are opened to drain the filter channel down to waste wash water troughs slightly above the filter bed and discharging through said low wall into the waste water conduit. Preferably such wash water troughs extend substantially across the filter channel and tend to produce a more uniform upward flow of wash water through the whole area of the filter bed and to prevent accumulation of the waste solids at a side wall of the filter channel. The means for controlling the height of liquid in the filtered effluent channel is then shifted to allow the water to reverse its flow and pass up through the filter bed thereby floating the accumulated solids from the filter bed and discharging them into the waste water troughs. When the washing of the filter bed is completed, the apparatus is again operated in its normal manner.

An advantageous feature of the invention is that no auxiliary units are required for washing the filter beds, such washing being done entirely by the hydrostatic head provided above the upper level of the wash water troughs.

Other features, objects and advantages will appear upon consideration of the following description and of the drawings in which Fig. 1 is a horizontal section of an apparatus embodying an approved form of the invention, the section being taken along the line 1—1 of Fig. 2;

Fig. 2 is a vertical section taken on the line 2—2 of Fig. 1;

Fig. 3 is a sectional view taken along the lines 3a—3a, 3b—3b, 3c—3c, 3d—3d, and 3e—3e of Fig. 1;

Fig. 4 is a fragmentary sectional view on a larger scale of part of the structure shown in Fig. 2;

Fig. 5 is a fragmentary top plan view of the part of the structure illustrated in Fig. 4;

Fig. 6 is a fragmentary perspective view illustrating the support for the filter medium;

Fig. 7 is a section taken on line 7—7 of Fig. 6;

Fig. 10 is a horizontal section of apparatus embodying a third form of the invention.

Figure 8:
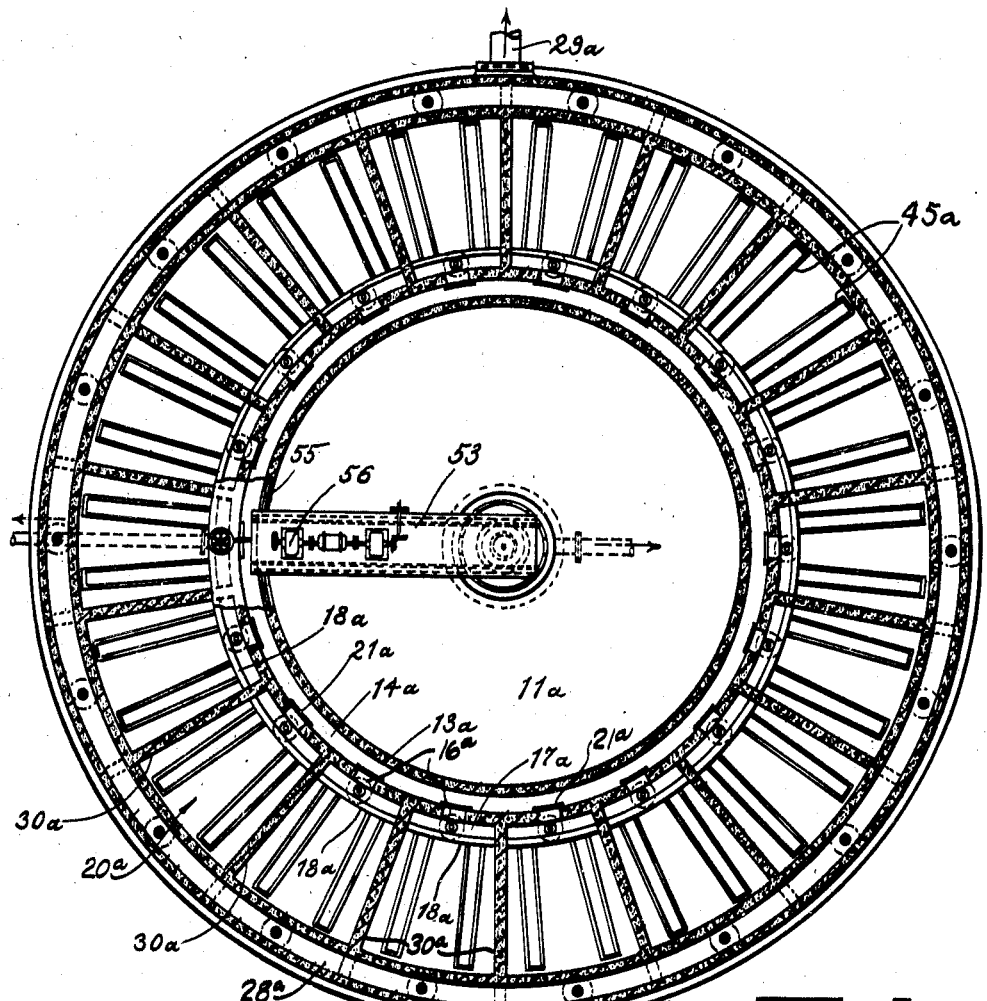
Fig. 8 is a top plan view of a second embodiment of the invention, the view being partly in section along the line 8—8 of Fig. 9.

Referring to Figs. 1 to 7, the sewage or other liquid to be treated passes through a pipe or conduit 10 into a contact tank 11 and around partitions or baffles 12, extending alternately from opposite ends of the tank, to an overflow wall 13 which is at the opposite side of the tank from the supply conduit 10. As illustrated the overflow wall 13 is at the inner side of a launder 14 projecting inwardly from a side wall 15 of the tank 11, and the overflow or supernatant liquid passes through one or more openings or passages 16 into one or more channels or channel sections 17 which in turn discharge over one or more walls 18 into the upper compartments 19 of filter channels or troughs 20. Preferably each filter influent opening or passage 16 is provided with a gate 21 controlled by a handle 21'. The liquid in the upper compartments 19 passes downwardly through a filter bed 22 of suitable material such as silica sand, crushed coal, quartz, ground glass, etc., into a lower or filter effluent chamber 23. Preferably the filter medium comprising bed 22 is supported on porous tiles 24 mounted on beams or cross members 25. From the lower or effluent chamber 23 the filtered effluent passes through one or more openings 26 into a chamber or compartment 27 beneath the bottom of a final effluent channel 28 which communicates near its top with an outlet or discharge pipe 29. As most clearly shown in Fig. 1, the different channels or sections 17 and the filter channels or troughs 19 may be separated by walls 30 which also extend downwardly to the floors of the lower filter chambers 23 and serve to separate chambers 27. It should be understood that, while it is desirable to divide the various channels and compartments by the walls 30, such walls may be omitted. From the chambers 27 the filtered effluent passes upwardly through openings or passages 31 into the final effluent channel or chamber 28.

In order that some of the filter sections may be kept in operation while others are being cleaned it is desirable to discharge the effluent, from filter sections in use, into the upper part of the channel 28, and for a reversal of flow through a filter bed to be cleaned, it is desirable to be able to draw out the liquid from a lower part of the channel 28. This result can be obtained in different ways but, as illustrated, it is obtained by means of control devices in the form of telescopic conduits 32, each having a larger lower section 33 receiving liquid from an opening 31 and a smaller upper section 32 receiving liquid from the lower section and discharging it into the upper part of the channel 28 when the telescopic device is expanded. It will be seen that such control devices 32 serve as gates over which the liquid flows. When a telescopic device is contracted, liquid in the channel 23 can readily be passed in reverse flow through the corresponding filter bed section if at that time the liquid level in the corresponding upper chamber 19 of a filter channel or trough 20 be sufficiently lowered. The length of each telescopic device 32 may be varied by means of a vertical rod 35 connected with the upper end of the part 32 and having a screw thread connection with a hand wheel 36 supported by a bracket 37 through which the rod 35 passes. Obviously the control devices 32 must be of sufficient capacity to enable a suitable rate of reverse flow. Furthermore it will be evident that each control device 32 could be replaced by an outlet in the side of the effluent channel and a vertically slidable gate which would always keep the lower part of the opening closed.

The different filter influent channels 17 may be drained through passages 38 at the bottom thereof into a waste water conduit or chamber 39 from which the waste water may be discharged through a pipe 40 thereby enabling the by-passing of the filter when desired or a back-wash cleaning of the filter bed 22 when the controlling devices in the form of telescopic conduits 32 are contracted or collapsed. Normally during the operation of the filter the passages 38 are closed by gates 41 whose positions may be determined by means including rods 42 having screw thread connections with such gates and being rotatable in brackets 43 at the top of the apparatus. The rods 42 may be rotated by hand wheels 44. To carry off the waste wash water produced in the back wash cleaning of the filter bed, provision may be made of waste wash water troughs 45 in the compartments 20 and draining into the lower part of the channels 17 through passages 46 extending through the wall or walls 18. Preferably the bottoms of the troughs 45 are inclined toward the openings 46 and the inclination of said bottoms may be adjustable by suitable supporting devices 47 for the ends of the troughs remote from the wall 18.

The operation of this form of the apparatus may be substantially as follows: The sewage supplied through the influent pipe 10 is purified to a substantial extent by the removal of a substantial amount of suspended solids during the passage of the sewage through the contact settling tank 11, and the supernatant liquid thus clarified flows over the wall 13 into the launder 14 and then through the passages 16 into the channel or channels 17 and the upper compartment or compartments 19 of the filtration device, the gates 41 being closed at this time. The sewage from the upper compartments 19 flows downwardly through the filter bed or beds 22, which serves to retain solids present in the sewage, into the lower filter compartments 23 and then through the compartments 27 and control devices or gates 32 into the main effluent conduit or channel 28 connected with the discharge pipe 29.

As the filter beds 22 become more and more clogged, the liquid level in the upper compartments 19 rises and when the clogging becomes too great the filter beds are cleaned one or more at a time. In cleaning a filter bed, the corresponding influent gate 21 is closed and the waste water gate 41 is opened thus draining the liquid in the upper compartment 19 down to the level of the upper edges of the waste water troughs 45. The control device or gate 32 is then lowered to reverse the flow of water through the filter bed 22 and by means of rapid upward flow through the filter to float the accumulated solids from the filter bed and discharge them into the waste wash water troughs 45 from which they drain through the passages 46 and 38 into the channel 39 communicating with the discharge pipe 40. Upon completion of the washing, the control device 32 is restored to its normal position, the gate 41 is closed and the influent gate 21 is opened.

Figure 9:
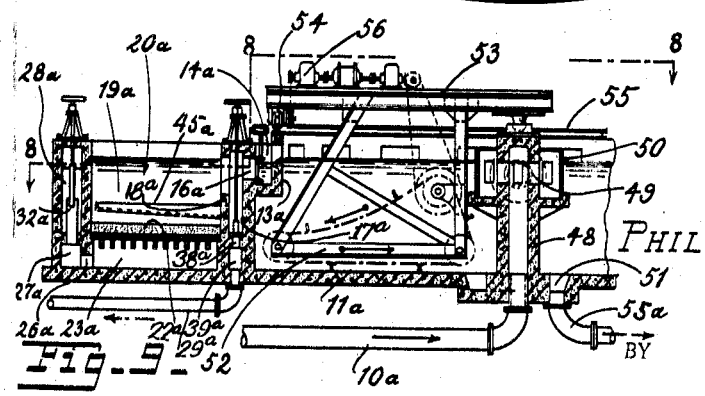
Fig. 9 is a fragmentary vertical section of the apparatus shown in Fig. 8.

In Figs. 8 and 9 there is disclosed a second embodiment in which the settling tank or basin 11a is round and the sewage from a supply pipe 10a passes upwardly through a hollow central pier 48 and is discharged therefrom into the tank through openings 49 in the pier, agitation of the liquid being minimized by means of a baffle 50 surrounding the pier at that height. The sewage flows outwardly towards the periphery of the tank and the solids gradually settle to the bottom of the tank and are then moved to the central part of the tank and discharged into an annular sump 51 by means of suitable scraping means 52 carried by a bridge 53 rotatably mounted on said pier 48 and mounted on the inner wall 13a of a launder 14a by means of wheels 54 at the lower side of the bridge and traveling on a rail 55 resting on the top of said wall 13a. From the sump 51 the sludge formed by the settled solids is drawn off through a pipe or conduit 55a. Mounted on the bridge is a motor 56 which drives one or more of the wheels 54 and also the scraping device 52.

The supernatant liquid is discharged from the tank 11a over weirs formed in the wall 13a into the launder 14a from which it passes through openings or ducts 16a into channels or troughs 17a separated by walls 30a. From the channels 17a the liquid passes over low walls 18a into upper chambers 19a of filter troughs or channels 20a and then downwardly through filter beds 22a into lower chambers 23a. From the chambers 23a the filtered effluent flows through passages 26a, compartments 27a and control devices 32a into the main effluent channel 28a which discharges through a pipe 29a (at the top of Fig. 8).

When backwash cleaning of the filter beds 22a is to be effected the passages 16a are closed by gates 21a and gates 41a at the bottom of chambers or channels 17a are opened in order to draw off the liquid in the upper filter compartment down to the level of the upper edges of the waste water troughs 45a, the liquid thus drawn off flowing downwardly through passages 38a into a chamber 39a from which it is discharged through a conduit 29a. As soon as the level of the liquid in the upper compartment of the filter channels is lowered to the level of the waste water troughs, the control devices 32a which serve as gates are lowered so that the water in the channel 28a can be utilized to produce a reverse flow through the filter bed and carry the solids floated from the filter bed into the waste water troughs to be drained from the apparatus. It will be evident that the operation of the second form of apparatus corresponds closely to that of the first form and that the only changes in the form of apparatus from that of the first form are such as required to adapt the apparatus for use with a round tank or one in which the sludge is moved toward the center of a revolving rake or scraping device.

In Fig. 10 there is illustrated a form of apparatus in which the back wash filters of the present invention are used in connection with sedimentation apparatus comprising long tanks into which the sewage is introduced near the upper surface of the liquid in the tanks, the supernatant liquid is removed from the tanks at points remote from the place of introduction of the sewage, and the sludge is drawn rearwardly along the bottoms of the tanks and discharged therefrom, at the ends where the influent sewage is admitted, and removed through a pipe 55b. Referring to said Fig. 10 the sewage is supplied through a conduit 10c to a channel 57 and through passages 58, controlled by gates 59, into tanks 11b and 11c in which a substantial proportion of the suspended solids settle to the bottoms of the tanks in the form of sludge, which is moved to the influent end of the tank by scraper mechanism 52a and deposited in sumps or hoppers 51a, the supernatant liquid being discharged over an overflow wall 13b into a launder 14b extending around the sides of the structure formed by the two tanks 11b and 11c at the end of said structure remote from the influent conduit 10c. The launder 14b communicates with filter channels 20b through openings or passages 16b, controlled by gates 21b, and with channels 17b separated from the filter channels by low walls 18b. From the upper compartments 19b of the filter chambers or channels 20b the liquid passes downwardly through the filter beds and upwardly through control devices 32b into a final effluent channel 28b from which it is discharged through a pipe 29b. In this as well as in the other forms the filter beds may be cleaned by reversing the flow of the liquid therethrough. In this form of apparatus the launder 14b passes along the ends of the tanks adjacent to the effluent channel 28b thereby rendering it easy to by-pass the filters through passages 60 controlled by gates 61.

While it would be possible by making the effluent channel of sufficient capacity and the settling tank of suitable proportions (in any of the illustrated forms of apparatus) to clean all of the filter sections at one time, it is in general much more desirable to clean one or more filter sections at a time and to maintain the normal operation of the other filter sections.

It will be evident that, if the level of the liquid is not lowered to any great extent in cleaning one or more filter sections, a better reverse flow can be maintained during the cleaning operation, and that such maintenance of liquid level can be effected to greatest advantage by using forms of apparatus in which the filter is divided into a relatively large number of sections.

It should be understood that various changes may be made and that certain features may be used without others, without departing from the true scope and spirit of the invention.

Having thus described my invention, I claim:

1. The combination of a downward flow filter receiving influent liquid to be filtered, shut-off means for preventing flow of influent liquid to the filter, an effluent channel receiving filtered effluent from the filter, shut-off means to prevent backward flow from the effluent channel to the filter, and means for lowering the liquid level in the influent side of the filter when the influent liquid and the effluent channel are shut off from the filter whereby, upon opening of the shut-off means between the filter and the effluent channel, liquid from the effluent channel will be caused to flow back through the filter and clean the same.

2. The combination with a downward flow filter receiving liquid to be filtered, an effluent channel receiving the filtered effluent from said filter, and means for effecting reverse-flow cleaning of said filter by filtered effluent including means for lowering the liquid level in the influent part of the filter below the level in the effluent channel, and waste-wash-water drainage means in said filter, said drainage means including troughs at the influent side of the filter communicating with the exterior of the filter.

3. In apparatus of the class described, an influent channel, a filter channel separated therefrom by a relatively low wall over which the liquid from said influent chamber flows, a filter bed dividing the filter channel into upper and lower compartments, an effluent channel receiving the filtered effluent and having an outlet at a substantial height above the filter bed, said low wall having an opening above the level of said filter bed, a trough above said filter bed discharging through said opening in the low wall, and means at the bottom of said influent channel to drain the same and lower the liquid to the level of said trough, whereby the liquid in the effluent chamber may flow in a reverse direction through said filter bed to remove the impurities from said bed and discharge them from the filter through said trough.

4. In apparatus of the class described, an influent channel receiving influent liquid to be filtered, means for shutting off the supply of influent liquid, normally closed means for discharging liquid from said influent channel, a filter channel separated from the influent channel by a relatively low wall having an opening therethrough, a filter bed below said opening dividing the filter channel into an upper chamber and a lower chamber, a drainage trough above the filter bed and discharging through said opening, an effluent channel receiving liquid from said lower chamber and having an outlet at a substantial distance above said bed, and means normally preventing back flow from the effluent channel to the lower filter compartment but shiftable to permit said back flow to be used, after draining the filter bed to the level of said trough, in washing the filter bed and discharging the waste wash water through said trough.

5. In apparatus of the class described, an influent channel divided into sections, a filter channel divided into corresponding sections separated from the influent channel sections by relatively low walls each having an opening therethrough, a trough in each of the filter sections communicating with the corresponding opening, a filter bed in each filter section below the level of the corresponding trough and dividing the filter sections into upper and lower compartments, an effluent channel having a connection with each of said lower compartments and having an outlet at a level higher than that of the troughs, means for closing the various connections between the lower filter compartments and the effluent channel, means for draining the various influent channel sections, and means for shutting off the supply of liquid to the various influent channel sections.

6. The combination of an overflow wall, a channel receiving influent liquid from said overflow wall, a filter bed in said channel dividing it into an upper chamber receiving the overflow liquid and a lower filtered effluent chamber, an effluent discharge channel receiving said filtered effluent and having an outlet above the level of the filter bed, adjustable overflow means between said filtered effluent chamber and said effluent discharge channel normally preventing back flow to the filter, and back wash means for cleaning the filter comprising means for shutting off the flow of influent liquid to said upper chamber, normally closed discharge means whereby liquid can be drawn from a part of said upper chamber below the level of said outlet, and means for varying said adjustable overflow means to enable liquid in the filtered effluent channel to flow upwardly through the filter and outwardly through said discharge means at the lower part of the upper compartment when said discharge means is open.

7. The combination of an influent channel, a filter channel separated from said influent channel by a relatively low wall having an opening therethrough, a filter bed below said opening dividing the filter channel into an upper influent chamber and a lower effluent chamber, an effluent channel at the opposite side of the filter channel from the influent channel and within which the filter effluent is kept substantially at a predetermined level by the hydrostatic head of the influent liquid and an effluent channel outlet above the level of the filter bed, and means for reverse-flow cleaning of the filter bed including means for shutting off the supply of liquid to the influent channel, means for draining the influent channel to lower the level of the liquid in the influent chamber of the filter to substantially the level of the opening in said low wall and permitting a reverse flow of liquid from the effluent channel through said filter bed to clean the same.

8. The combination with a settling tank, to which solid-containing liquid is supplied at an influent end and discharged in clarified condition over the tank wall at the other end thereof, and means for moving the settled sludge back along the tank bottom to the influent end, of a launder extending across the discharge end of the settling tank and along the sides of the tank, of influent channels outside of the portions of the launder at the sides of the settling tank, each of said influent channels being divided into sections, a gate device for separating each of said sections from the launder, filter channel sections at the outer side of said influent channels and separated therefrom by relatively low walls each having an opening therethrough, means for separately draining said influent channel sections, filter beds in said filter channel sections, below said openings and dividing the filter channel sections into upper and lower compartments, an effluent channel extending across the discharge end of the settling tank just outside of said launder and along the outer sides of said filter channel sections where it is connected with the lower compartment of each of said filter sections, and gates between the adjacent portions of the launder and the effluent channel.

PHILIP B. STREANDER.